(12) United States Patent
Phelan et al.

(10) Patent No.: US 11,080,244 B2
(45) Date of Patent: Aug. 3, 2021

(54) INTER-VERSION MAPPING OF DISTRIBUTED FILE SYSTEMS

(71) Applicant: HEWLETT PACKARD ENTERPRISE DEVELOPMENT LP, Houston, TX (US)

(72) Inventors: Thomas A. Phelan, San Francisco, CA (US); Gunaseelan Lakshminarayanan, Cupertino, CA (US); Michael Moretti, Mountain View, CA (US); Joel Baxter, San Carlos, CA (US); Lakshman Chinnakotla, Redwood City, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 584 days.

(21) Appl. No.: 14/288,506

(22) Filed: May 28, 2014

(65) Prior Publication Data
US 2015/0347450 A1    Dec. 3, 2015

(51) Int. Cl.
*G06F 16/182*    (2019.01)
*G06F 9/455*    (2018.01)
(Continued)

(52) U.S. Cl.
CPC ........ *G06F 16/182* (2019.01); *G06F 9/44536* (2013.01); *G06F 9/45558* (2013.01);
(Continued)

(58) Field of Classification Search
CPC ........... G06F 17/30194; G06F 9/45558; G06F 2009/4557; G06F 16/182; G06F 9/44536
(Continued)

(56) References Cited

U.S. PATENT DOCUMENTS

| 6,195,662 | B1 * | 2/2001 | Ellis | ...................... G06F 40/151 |
| | | | | 707/999.008 |
| 7,949,692 | B2 | 5/2011 | Lemar et al. | |

(Continued)

FOREIGN PATENT DOCUMENTS

| CN | 102195895 A | * | 9/2011 | ........... H04L 51/066 |
| CN | 103561033 A | | 2/2014 | |

(Continued)

OTHER PUBLICATIONS

Shvachko et al., "The Hadoop Distributed File System", 2010, 978-1-4244-7153-9/10 IEEE, 10 pages printed (Year: 2010).*

(Continued)

*Primary Examiner* — Alex Gofman
*Assistant Examiner* — Michael Le
(74) *Attorney, Agent, or Firm* — Jaffery Watson Mendonsa & Hamilton

(57) ABSTRACT

Systems, methods, and software described herein to provide data to large-scale processing framework (LSPF) nodes in LSPF clusters. In one example, a method to provide data includes receiving an access request from a LSPF node to access data in accordance with a version of a distributed file system. The method further includes, responsive to the access request, accessing the data for the LSPF node in accordance with a different version of the distributed file system, and presenting the data to the LSPF node in accordance with the version of the distributed file system used by the LSPF node.

12 Claims, 7 Drawing Sheets

(51) Int. Cl.
*G06F 9/54* (2006.01)
*G06F 9/445* (2018.01)

(52) U.S. Cl.
CPC ...... *G06F 9/541* (2013.01); *G06F 2009/4557* (2013.01); *G06F 2009/45579* (2013.01)

(58) Field of Classification Search
USPC .......................................................... 707/825
See application file for complete search history.

(56) References Cited

U.S. PATENT DOCUMENTS

| | | | |
|---|---|---|---|
| 8,266,182 | B2 | 9/2012 | Wanigasekara-Mohotti et al. |
| 2002/0059307 | A1* | 5/2002 | Tomita ................... G06F 16/258 |
| 2005/0253739 | A1 | 11/2005 | Hu et al. |
| 2006/0248058 | A1* | 11/2006 | Feng ...................... G06F 16/258 |
| 2009/0210426 | A1* | 8/2009 | Kulakov .................. G06F 16/29 |
| 2011/0302583 | A1 | 12/2011 | Abadi et al. |
| 2012/0278473 | A1 | 11/2012 | Griffiths |
| 2013/0124483 | A1 | 5/2013 | Furuhashi et al. |
| 2013/0227558 | A1 | 8/2013 | Du et al. |
| 2013/0254246 | A1 | 9/2013 | Lipcon |
| 2013/0275363 | A1* | 10/2013 | Wu ........................... G06F 9/46 707/602 |
| 2014/0059163 | A1 | 2/2014 | Herbrich et al. |
| 2014/0059310 | A1 | 2/2014 | Du et al. |
| 2014/0067864 | A1 | 3/2014 | Holland et al. |

FOREIGN PATENT DOCUMENTS

| | | | |
|---|---|---|---|
| CN | 103647797 A | | 3/2014 |
| EP | 3149574 A1 | | 4/2017 |
| WO | WO 97/38388 | * | 10/1997 |
| WO | 2015/183344 A1 | | 12/2015 |

OTHER PUBLICATIONS

Extended European Search Report Received for EP Patent Application No. 15800015.8, dated Mar. 27, 2018, 8 pages.
Search Report and Written Opinion received for PCT Application No. PCT/US2015/010200, dated Apr. 29, 2015, 13 pages.
Google, "Easier, faster and lower cost Big Data processing with the Google Cloud Storage Connector for Hadoop," available online at <https://cloudplafform.googleblog.com/2014/01/easier-faster-lower-cost-big-data-processing-with-the-google-cloud-storage-connector-for-hadoop.html>, Jan. 14, 2014, 3 pages.
Google, "Performance advantages of the new Google Cloud Storage Connector for Hadoop", available online at <https://cloudplafform.googleblog.com/2014/01/performance-advantages-of-the-new-google-cloud-storage-connector-or-hadoop.html>, Jan. 15, 2014, 8 pages.
Kolakowski, Nick, "Google Releases Cloud Storage Connector for Hadoop", Dice, available online at <https://insights.dice.com/2014/01/16/google-releases-cloud-storage-connector-for-hadoop/>, Jan. 16, 2014, 4 pages.
Pinkerton et al., "A Heterogeneous Distributed File System", IEEE, 1990, pp. 424-431.

* cited by examiner

INTER-VERSION MAPPING OF DISTRIBUTED FILE SYSTEMS

TECHNICAL FIELD

Aspects of the disclosure are related to computing hardware and software technology, and in particular to inter-version mapping of distributed file systems.

TECHNICAL BACKGROUND

An increasing number of data-intensive distributed applications are being developed to serve various needs, such as processing very large data sets that generally cannot be handled by a single computer. Instead, clusters of computers are employed to distribute various tasks or jobs, such as organizing and accessing the data and performing related operations with respect to the data. Various applications and frameworks have been developed to interact with such large data sets, including Hive, HBase, Hadoop, Amazon S3, and CloudStore, among others. These applications and frameworks often employ various distributed file systems that allow faster access to the computers initiated within the cluster. However, as innovations are made to the file systems and frameworks, different versions of the framework may not be able to access different versions of the file system.

In addition to the advances in distributed applications and frameworks, virtualization techniques have gained popularity and are now commonplace in data centers and other environments in which it is useful to increase the efficiency with which computing resources are used. In a virtualized environment, one or more virtual machines are instantiated on an underlying computer (or another virtual machine) and share the resources of the underlying computer. Thus, rather than having a single processing node per computing device, a cluster may employ a plurality of virtual machines per computing device to more efficiently distribute the workload.

OVERVIEW

Provided herein are systems, methods, and software to provide data to large-scale processing framework (LSPF) nodes in a LSPF cluster. In one example, a method to provide data includes receiving an access request from a LSPF node to access data in accordance with a version of a distributed file system. The method further includes, responsive to the access request, accessing the data for the LSPF node in accordance with a different version of the distributed file system, and presenting the data to the LSPF node in accordance with the version of the distributed file system used by the LSPF node.

In another instance, a computer apparatus to provide data to a LSPF node in a LSPF cluster includes processing instructions that direct a data service computing system, when executed by the data service computing system, to receive an access request from the LSPF node to access data in accordance with a version of a distributed file system. The processing instructions further direct the data service computing system to, responsive to the access request, access the data for the LSPF node in accordance with a different version of the distributed file system, and present the data to the LSPF node in accordance with the version of the distributed file system used by the LSPF node. The computer apparatus also includes one or more non-transitory computer readable media that store the processing instructions.

In another example, a system to provide data to a LSPF node in a LSPF cluster includes the LSPF node configured to initiate an access request to access data in accordance with a version of a distributed file system. The system further includes a data service configured to identify the access request and, responsive to the access request, access the data for the LSPF node in accordance with a different version of the distributed file system. The data service is further configured to present the data to the LSPF node in accordance with the version of the distributed file system used by the LSPF node.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Various implementations described herein offer systems, methods, and software to provide data to large-scale processing framework (LSPF) nodes in LSPF clusters. In particular, applications and frameworks have been developed to process vast amounts of data from storage volumes using one or more processing systems. These processing systems may include real processing systems, such as server computers, desktop computers, and the like, as well as virtual machines within these real or host processing systems.

In at least one implementation, one or more virtual machines are instantiated within a host environment. The virtual machines may be instantiated by a hypervisor running in the host environment, which may run with or without an operating system beneath it. For example, in some implementations, the hypervisor may be implemented at a layer above the host operating system, while in other implementations the hypervisor may be integrated with the operating system. Other hypervisor configurations are possible and may be considered within the scope of the present disclosure.

The virtual machines executed by the hypervisor may include various guest elements, such as a guest operating system and its components, guest applications, and the like, that consume and execute processes on data. The virtual machines may also include virtual representations of various computing components, such as guest memory, a guest storage system, and a guest processor.

In one example, a guest element running within the virtual machine, such as a map reduce application or framework for working with large data sets, may require data for processing. This application or framework is used to access data from one or more storage volumes, and process the data in parallel with one or more other real or virtual computing nodes. In the present example, a LSPF cluster may contain one or more nodes that are capable of processing data using a particular version of a distributed file system. Accordingly, when the nodes within the LSPF cluster require data, the nodes may initiate an access request using the particular distributed file system. Responsive to this request, a data service process may identify the access requests, and access the appropriate data using a different version of the distributed file system. In turn, the data service process may present the data to the LSPF nodes in accordance with the particular version of the distributed file system used by the nodes in the LSPF cluster.

Figure 1:
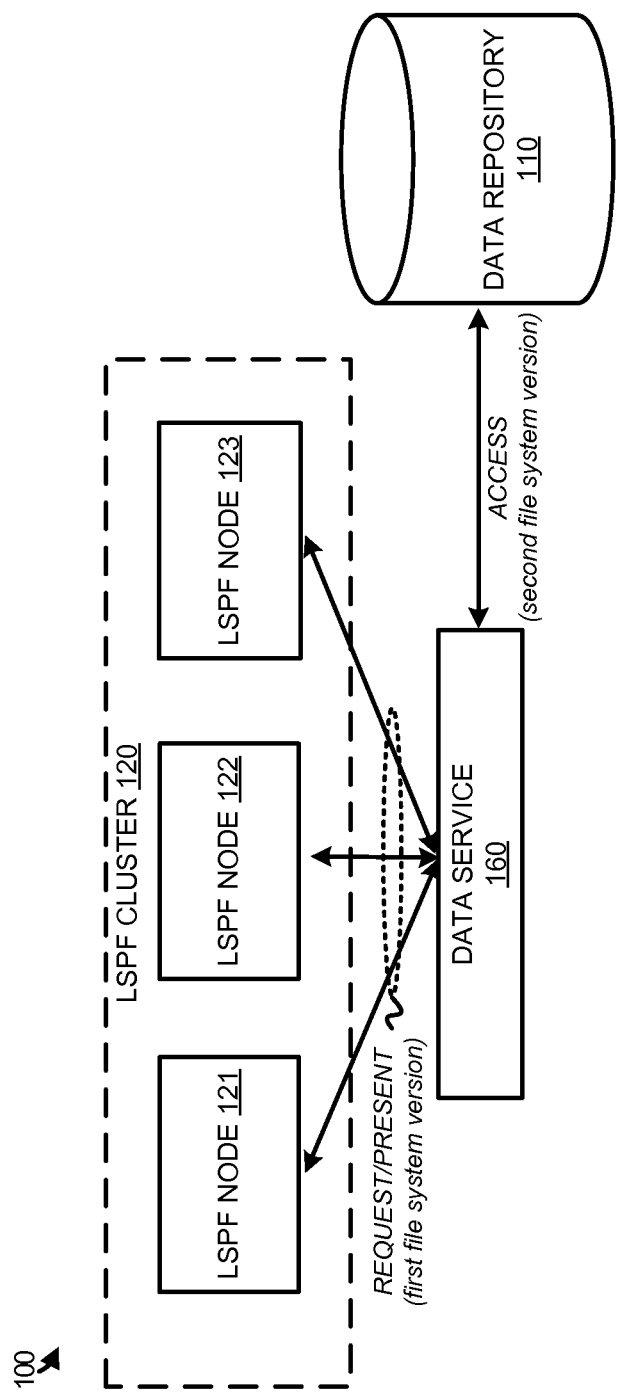
FIG. 1 illustrates a computing environment for providing data to large-scale processing framework nodes in a large-scale processing framework cluster.

Referring now to FIG. 1, FIG. 1 illustrates a computing environment 100 to provide data to LSPF nodes in a LSPF cluster. Computing environment 100 includes data repository 110, LSPF cluster 120, and data service 160. LSPF cluster 120 further includes LSPF nodes 121-123, which use a first distributed file system (DFS) version to request data from data repository 110. Although illustrated in the present example with three nodes, it should be understood that LSPF cluster 120 might include any number of nodes to support the parallel processing of large data sets.

In operation, LSPF nodes 121-123 may represent real or virtual machines that are initiated by an administrator or some other management entity to process large amounts of data in parallel with the other nodes. In the present example, each of LSPF nodes 121-123 may be configured with a processing or map-reduce framework, such as Hadoop, Spark, Disco, or some other data processing framework. As nodes 121-123 are initiated, the nodes may require data for processing from data repository 110. As illustrated in computing environment 100, the data within data repository 110 is accessed using a different distributed file system version than what is used by the various nodes in LSPF cluster 120. Accordingly, data service 160, which is responsible for gathering the data for processing, provides the content in an acceptable form for the various nodes.

Figure 2:
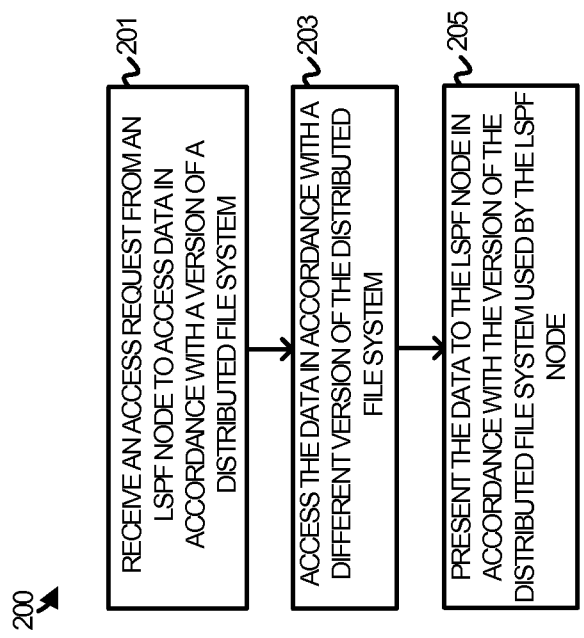
FIG. 2 illustrates a method to provide data to a large-scale processing framework node in a large-scale processing framework cluster.

To further demonstrate the supplying of data to nodes in an LSPF cluster, FIG. 2 is included. FIG. 2 illustrates a method 200 to provide data to a LSPF node in a LSPF cluster. As depicted in FIG. 2, method 200 includes receiving an access request from a LSPF node to access data in accordance with a version of a distributed file system (201). Responsive to the request, the method includes accessing the data in accordance with a different version of the distributed file system (203), and presenting the data to the LSPF node in accordance with the version of the distributed file system used by the LSPF node (205).

As previously described in FIG. 1, one or more LSPF nodes may be initiated within an LSPF cluster to process large data sets. Once the nodes are initiated, the nodes may require data from a storage repository, such as data repository 110. For example, node 121 may request data using a first DFS version. Responsive to the request, data service 160, or another similar process between node 121 and data repository 110, accesses the requested data for node 121. In the present example, the distributed file system version used for the node is not equivalent to the distributed file system version used to access the data in data repository 110. Accordingly, the data that is provided to the node must be presented or translated in accordance with the file system version for the node.

For instance, LSPF node 121 uses the first DFS version to request a first data item. Responsive to the request, data service 160 identifies and accesses the first data item in accordance with a second DFS version. Once the item is accessed in accordance with the second DFS version, the first data item is provided to node 121 according to the first DFS version. Thus, although the data item is stored and accessed using a different DFS version in data repository 110, data service 160 supplies the item to the node in accordance with the DFS version for that node.

Returning to the elements of computing environment 100, LSPF nodes 121-123 comprise real or virtual computing nodes capable of cooperative operation in LSPF cluster 120. LSPF nodes 121-123 may each include real or virtual processing systems, storage systems, communication interfaces, user interfaces, as well as other computing elements. In examples where LSPF nodes 121-123 comprise virtual computing nodes, LSPF nodes 121-123 may operate on one or more host computing devices and hypervisors that are used to abstract the physical components of the host machine and provide them to virtual nodes. Accordingly, multiple LSPF nodes may be implemented on the same host machine, allowing the nodes to share the physical resources of the host system.

Data service 160 comprises one or more computing systems capable of providing data from data repository 110 to LSPF nodes 121-123. Although illustrated separate from LSPF nodes 121-123, it should be understood that data service 160 might be implemented wholly or partially on the same devices responsible for LSPF nodes 121-123. Data service 160 may comprise a processing system, a storage system, communication interfaces, user interfaces, or any other similar computing element.

Data repository 110 includes any storage medium capable of storing data for processing in LSPF cluster 120. Data repository 110 may include disk drives, solid state drives, or any other similar storage media. In some examples, data repository 110 includes a variety of data stored using a variety of different distributed file system versions, such as versions of the Hadoop distributed file system, versions of the Google file system, versions of the Gluster file system, or any other distributed file system version—including combinations thereof. Accordingly, data service 160 may be used to provide content to nodes that use a different DFS version than data that is stored in data repository 110.

Figure 3:
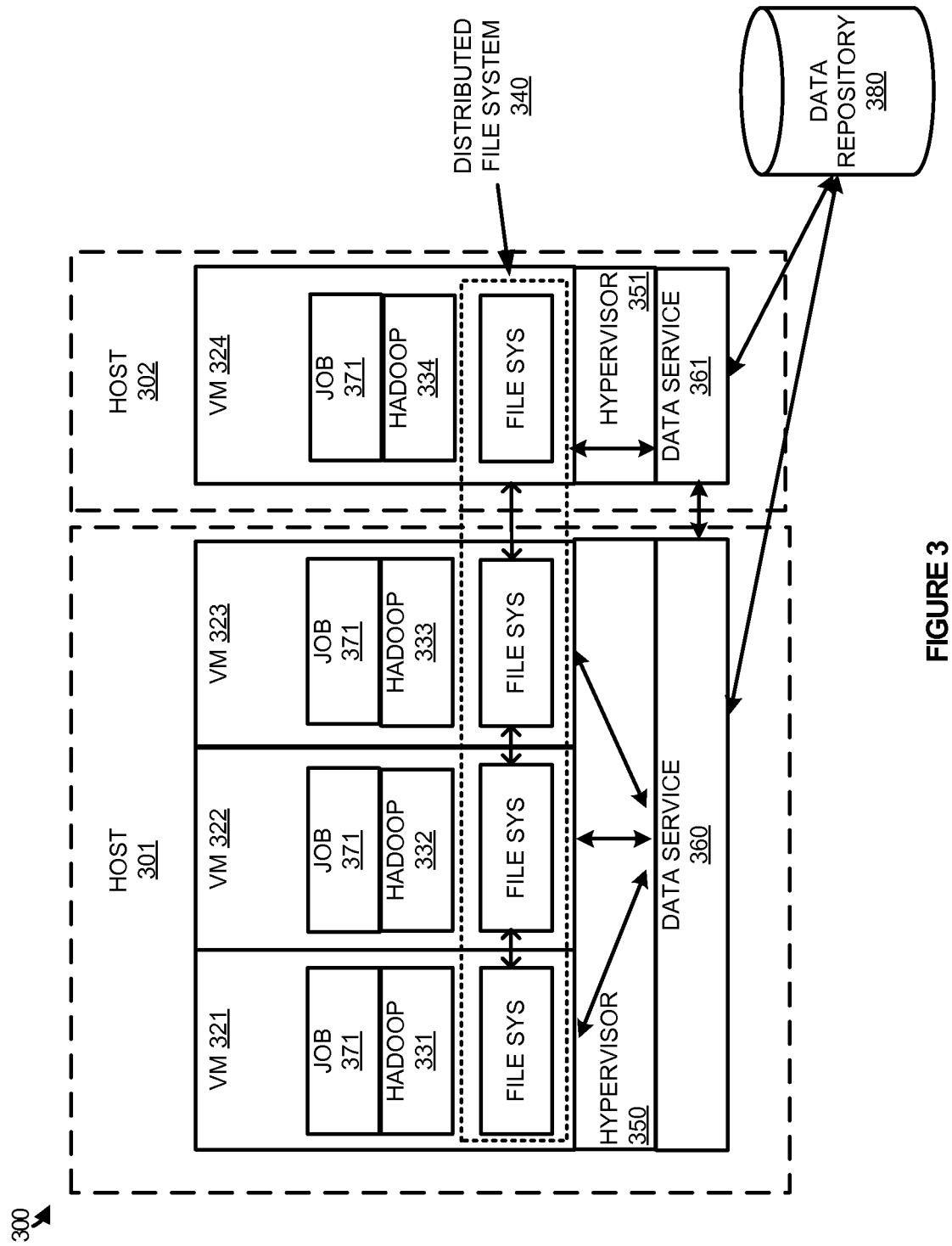
FIG. 3 illustrates a virtual large-scale processing framework cluster.

Turning to FIG. 3, FIG. 3 illustrates a virtual LSPF cluster 300 according to one example. LSPF cluster 300 includes hosts 301-302 and data repository 380. Hosts 301-302 further include data services 360-361 and hypervisor 350-351, which are used to operate virtual machines (VMs) 321-324. VMs 321-324 further include job 371, Hadoop instances 331-334 and distributed file system (DFS) 340. Although Hadoop instances are illustrated in the present example, it should be understood that any similar map reduce or data processing framework might be implemented across VMs 321-324.

In operation, hypervisors 350-351 are used to abstract the components from hosts 301-302 and provide the components to VMs 321-324, which allows VMs 321-324 to execute as an LSPF cluster. As depicted in FIG. 3, VMs 321-324 include Hadoop instances 331-334 that are used to provide map reduce functionality for job 371 within cluster 300. Hadoop instances 331-334 use DFS 340 to identify data for processing within each of the individual nodes, although the data requested may be stored using an alternative version of the DFS.

Accordingly, in the present example, data services 360-361 receive access requests from VMs 321-324 to access data in accordance with the DFS version for DFS 340. Responsive to the requests, data services 360-361 access the data in accordance with a second version of the DFS, and present the data to VMs 321-324 in accordance with the DFS version for DFS 340. For example, DFS 340 may use a first version of the Hadoop DFS, however, the data to be accessed may use a second version of Hadoop DFS. As a result, in the present example, data services 360-361 may act as intermediaries to access and present the data to the VMs.

Although illustrated in the previous example using different versions of the Hadoop file system, it should be understood that similar operations might be used between entirely different versions of file systems. For instance, an LSPF node may request data using a Hadoop DFS version, but the data service may access the data using a Google file system version, or some other distributed file system version.

Figure 4:
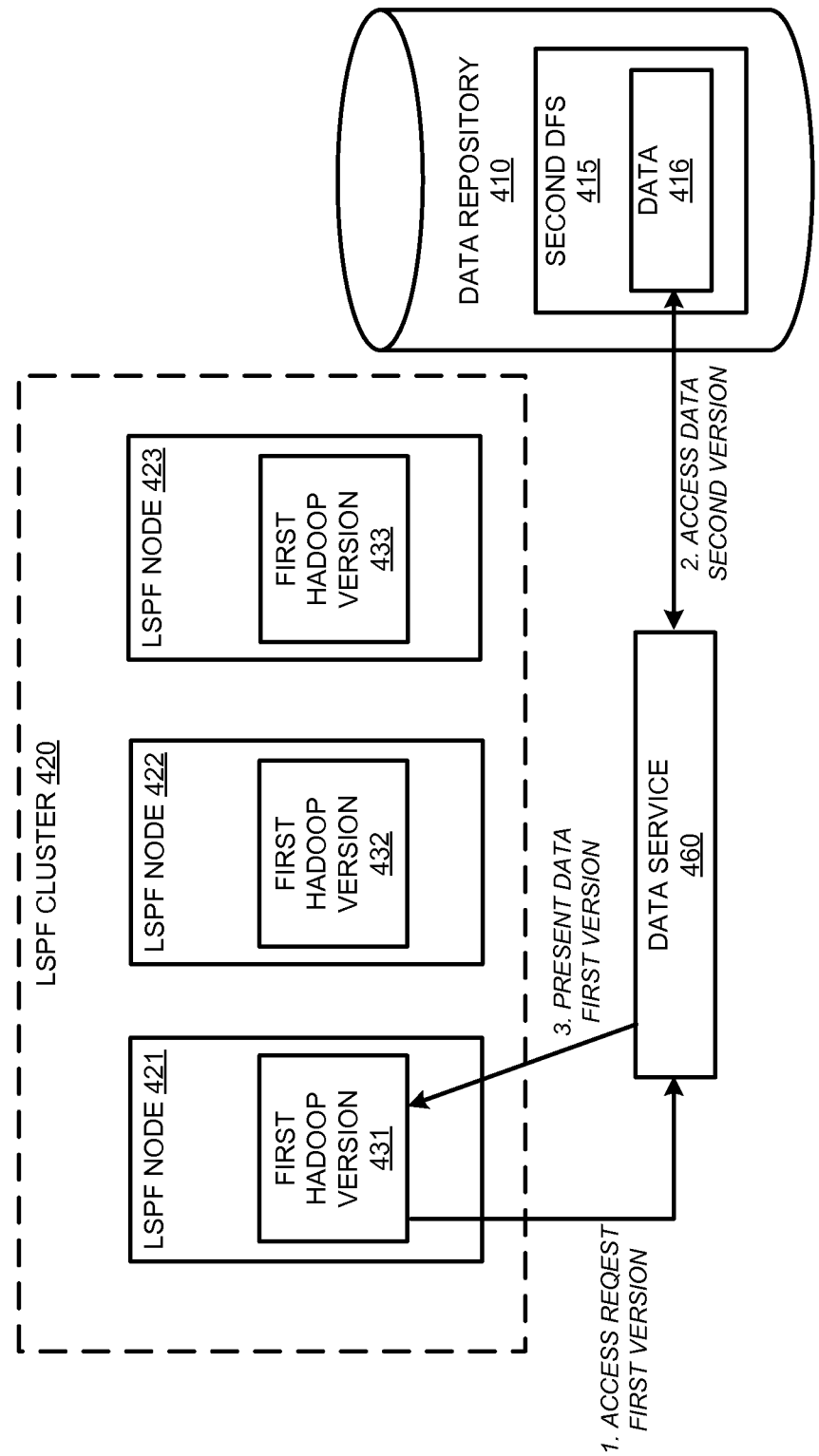
FIG. 4 illustrates an overview for providing data to a large-scale processing framework node in a large-scale processing framework cluster.

Turning to FIG. 4, FIG. 4 illustrates an overview for providing data to LSPF nodes in an LSPF cluster. FIG. 4 includes data repository 410, LSPF cluster 420, and data service 460. LSPF cluster 420 further includes LSPF nodes 421-423 that execute first Hadoop version instances 431-433. Data repository 410 further includes second DFS version 415 that is used to store data 416.

In operation, an administrator or some other similar management process initiates LSPF cluster 420 to process data sets stored in data repository 410. LSPF nodes 421-423 within LSPF cluster 420 include a first version of the Hadoop framework that accesses data using a first DFS version. However, as depicted, data as it is stored in data repository 410 is accessible using a second DFS version 415. Accordingly, access requests for the data must be identified in accordance with the first DFS version and the data must be accessed using the second DFS version.

For example, first Hadoop version instance 431 initiates a data access request using a first version of a distributed file system. Once the access request is received by data service 460, data service 460 accesses the data using second DFS version 415. After accessing the appropriate data, data service 460 presents the data to LSPF node 421 in accordance with the first version of the DFS. Accordingly, although the file system within LSPF node 421 may manage the data in accordance with a first file system version, the actual data may be stored within data repository 410 in accordance with an alternative version of the file system.

In some examples, data service 460 may be used to supply data to virtual LSPF nodes. As such, the data service may be located wholly or partially within the host to supply data from the data repository to each of the virtual LSPF nodes initiated on the host. For instance, a driver or some other process may be located within each of the LSPF nodes. As data is required for the nodes, the driver may identify the requests and notify data service 460 of the request in accordance with a first DFS version. Responsive to the request, data service 460 accesses the appropriate data and provides the data to the LSPF node using the first DFS version. Thus, although the nodes may be initiated with a first framework and DFS version, the data within a storage repository may be stored using an alternative DFS version.

Further, while illustrated in the present example as accessing data using second DFS version 415, it should be understood that data repository 410 or other data repositories accessible by the LSPF nodes and data service 460 might store data using a variety of different DFS versions. Thus, data service 460 may be responsible for accessing data using second DFS version 415 and any other file system version that includes data for processing by LSPF nodes 421-423.

Figure 5:
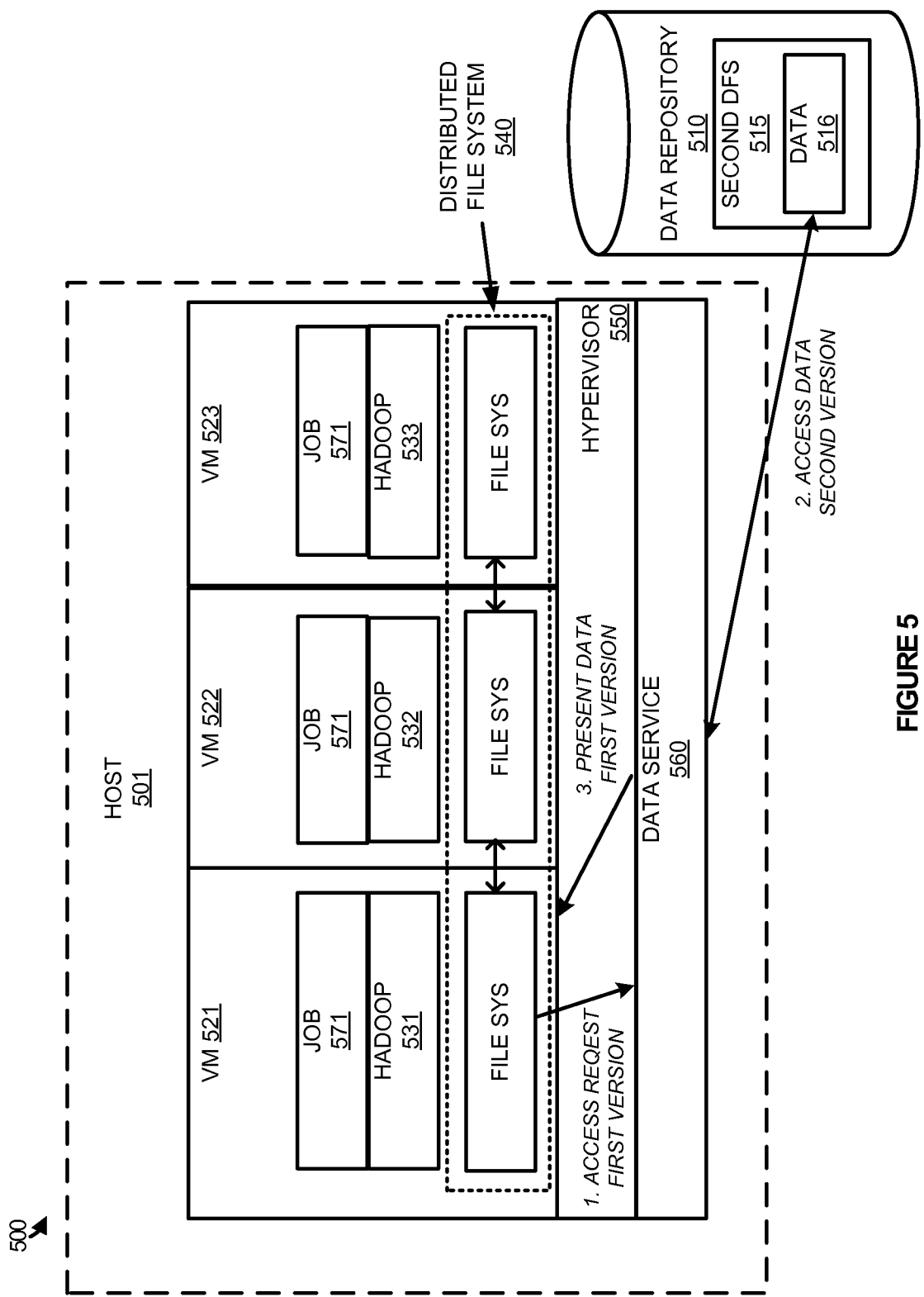
FIG. 5 illustrates an overview for providing data to a large-scale processing framework node in a virtual large-scale processing framework cluster.

Referring now to FIG. 5, FIG. 5 illustrates an overview 500 for providing data to LSPF nodes in a virtual LSPF cluster. Overview 500 includes data repository 510 and host 501, which further comprises VMs 521-523. VMs 521-523 are configured with Hadoop instances 531-533 to process job 571. VMs 521-523 further include distributed file system (DFS) 540 to access data located in data repository 510.

In operation, host 501 executes VMs 521-523 using hypervisor 550 to abstract the physical components of host 501 and provide the components to VMs 521-523. Hypervisor 550 may be software, firmware, or hardware on host 501 that is used present the guest operating systems within VMs 521-523 with a virtual operating platform. As VMs 521-523 execute, Hadoop instances 531-533 process data supplied by data service 560 to complete job 571.

As illustrated in FIG. 5, VMs 521-523 use distributed file system 540 to manage the parallel processing of data across the individual virtual machines. When a Hadoop instance requires data, such as Hadoop instance 531, an access request is initiated that requests data in accordance with the version of the file system associated with distributed file system 540. Responsive to the request, data service 560 accesses the data using a second version of the distributed file system, and presents the data to VM 521 using the first version of the file system. Accordingly, although a cluster may be initiated with a first version of a data processing framework that uses a first version a distributed file system, the cluster may access data that is stored using a data service to access the data in accordance with a second version of the distributed file system.

Figure 6:
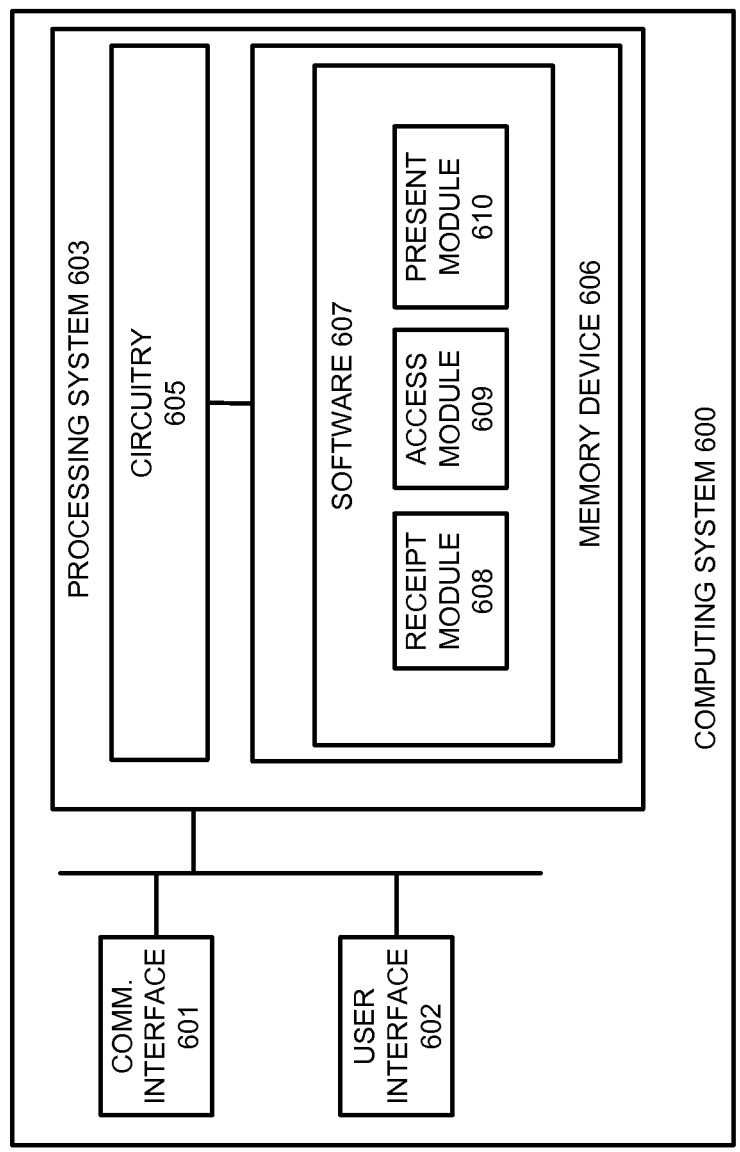
FIG. 6 illustrates a computing system for providing data to a large-scale processing framework node in a large-scale processing framework cluster.

Referring now to FIG. 6, FIG. 6 illustrates a computing system 600 for providing data to LSPF nodes in a LSPF cluster. Computing system 600 is an example of any computing system, device, or system of devices capable of implementing the data service described in FIGS. 1-5. Computing system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof. In some examples, communication interface 601 may be configured to communicate with one or more real or virtual machines within an LSPF cluster, and may be further configured to communicate with a storage repository to provide data to the real or virtual machines.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes receipt module 608, access module 609, and present module 610. Operating software 607 may further include an operating system, utilities, drivers, network interfaces, applications, or some other type of software. When executed by circuitry 605, operating software 607 directs processing system 603 to operate computing system 600 as described herein.

In particular, receipt module 608 is configured to receive or identify access requests from one or more LSPF nodes in an LSPF cluster to access data in accordance with a first version of a distributed file system. Responsive to the requests, access module 609 accesses the data in accordance with a second version of a distributed file system, and present module 610 presents the data to the LSPF nodes in accordance with the first version of the distributed file system used by the LSPF nodes.

In some examples, data may be stored in a storage repository using a particular version of a distributed file system that is associated with a map reduce framework. As features or other components are changed to create a new version of the map reduce framework, matching new versions of the distributed file system may also be created. Accordingly, as new versions of the map reduce framework are initiated, the framework may no longer match to the older versions of the file system, and vice versa. Thus, computing system 600 may be used to present data from an older file system version to a newer map reduce framework version in the LSPF cluster, or present data from a newer file system version to an older map reduce framework version in the LSPF cluster.

Figure 7:
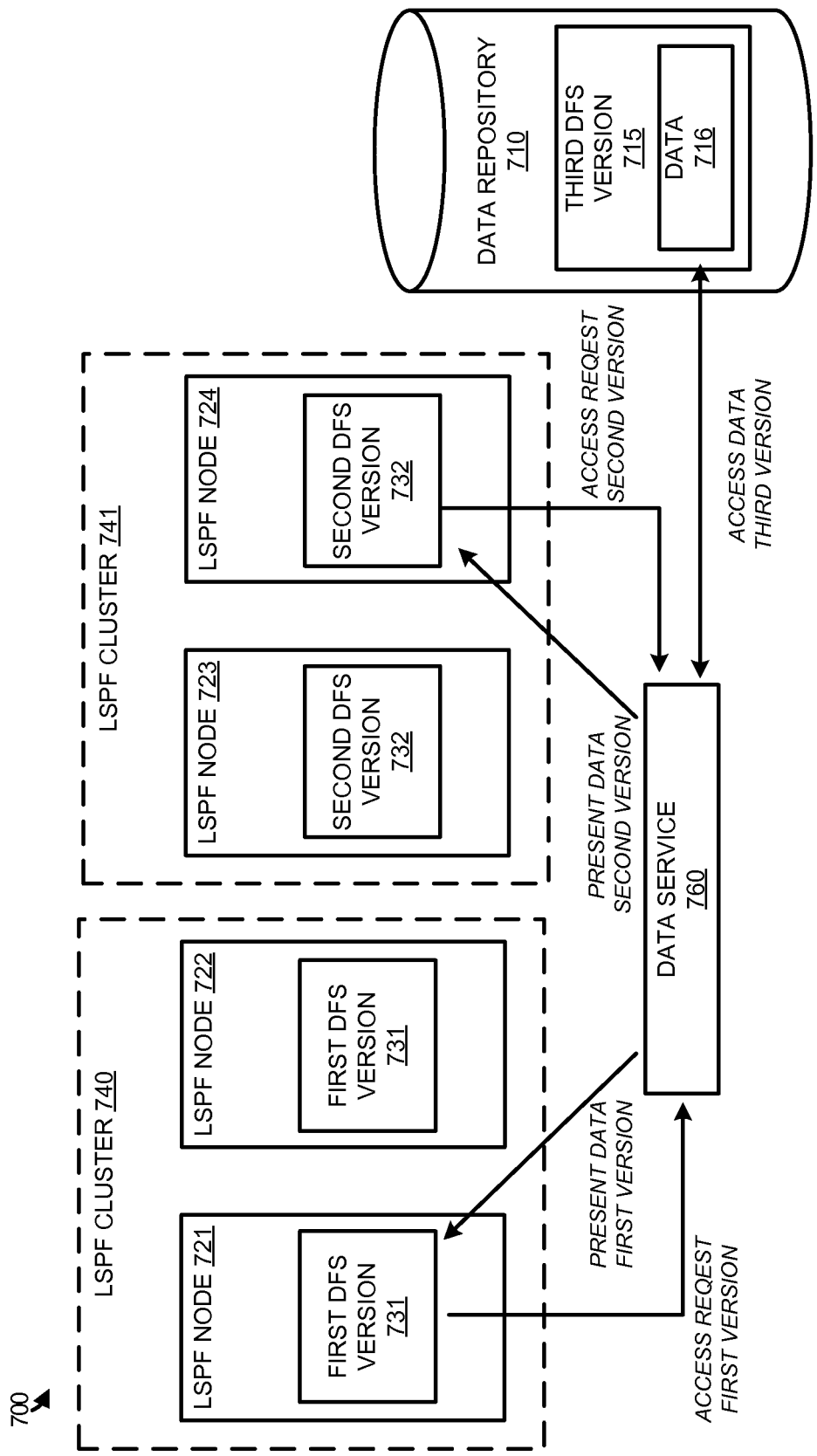
FIG. 7 illustrates an overview for providing data to large-scale processing framework nodes in multiple virtual large-scale processing framework clusters.

FIG. 7 illustrates an overview 700 for providing data to LSPF nodes in multiple LSPF clusters. Overview 700 includes data repository 710, LSPF clusters 740-741, and data service 760. Data repository 710 stores data 716 using a third DFS version 715. LSPF cluster 740 includes LSPF nodes 721-722 that initiate access requests using a first DFS version 731, and LSPF cluster 741 includes LSPF nodes 721-722 that initiate access requests using a second DFS version 732.

In operation, LSPF clusters 740-741 are initiated to process data that is stored in data repository 710. As data is required for each of the nodes, the nodes initiate access requests using the local DFS present on each of the nodes. Responsive to the requests, data service 760 accesses the appropriate data in accordance with the actual DFS version for the data storage, and presents the data to the LSPF nodes using the local DFS version for the node.

For example, LSPF node 721 includes first DFS version 731 for accessing the data necessary for processing. Accordingly, although LSPF node 721 may be configured with a first DFS version, the data that needs to be accessed may be stored in a distinctly different version of the DFS. As illustrated, LSPF node 721 initiates a data access request using the first version of the file system 731. Responsive to the request, data service 760 accesses the data in accordance with a third version of the file system 715 and returns the data to LSPF node 721 in accordance with the first version of the file system 731. Thus, although clusters 740-741 use different versions of the file system, data service 760 provides access to data items in data repository 710 using a third version of the file system.

Although illustrated in the present example as accessing data using third DFS version 715, it should be understood that data service 760 might access data using a variety of other file system versions. Accordingly, if data were stored using a fourth file system version, data service 760 may be capable of receiving the data requests from clusters 740-741, accessing the data using the fourth file system version, and presenting the data to the LSPF nodes in accordance with the file system that was used to make the request. For example, LSPF node 721 may initiate a request using a first version of the file system 731. Responsive to the request, data service 760 would access the data using the fourth version of the file system, and present the data to LSPF node 721 in accordance with the first version of the file system 731.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. An apparatus comprising:
   one or more non-transitory computer readable storage media;
   a processing system operatively coupled with the one or more non-transitory computer readable storage media; and
   processing instructions stored on the one or more non-transitory computer readable storage media to implement a data service that, when executed by the processing system, direct the processing system to:
   identify, on a first large-scale processing framework (LSPF) node of a first SPF cluster of a plurality of LSPF clusters, a first data access request generated by a process executing on the first LSPF node and, on a second LSPF node of a second LSPF cluster of the plurality of LSPF clusters, a second data access request generated by a process executing on the second LSPF node, wherein LSPF nodes of the first LSPF cluster comprise virtual computing nodes on one or more host computing systems to perform parallel processing of a first data set according to a first version of a distributed file system and LSPF nodes of the second LSPF cluster comprise virtual computing nodes on one or more of the host computing systems to perform parallel processing of a second data set according to a second version of the distributed file system;
in response to identification of the first data access request and the second data access request, notify the data service executing on one or more of the host computing systems regarding the first data access request and the second data access request;
receive, by the data service, the first data access request from the first LSPF node of the first LSPF cluster to access first requested data from a data repository, the first data access request comprising a request in accordance with the first version of the distributed file system, and receive the second data access request from the second LSPF node of the second LSPF cluster to access second requested data from the data repository, the second data access request comprising a request in accordance with the second version of the distributed file system, wherein the data service is shared by LSPF nodes of the plurality of LSPF clusters, and wherein data is stored in the data repository using a plurality of versions of the distributed file system, including a third version of the distributed file system, different from the first version and the second version;
responsive to the first data access request and the second data access request, determine that the first requested data and the second requested data are stored using the third version of the distributed file system and access the data in the data repository for the first LSPF node and for the second LSPF node in accordance with the third version of the distributed file system; and
present the first requested data accessed from the data repository to the first LSPF node in accordance with the first version of the distributed file system used by the first LSPF node, and present the second requested data accessed from the data repository to the second LSPF node in accordance with the second version of the distributed file system used by the second LSPF node.

2. The apparatus of claim 1 wherein the distributed file system comprises one Hadoop distributed file system.

3. The apparatus of claim 1 wherein the distributed file system comprises a Cluster file system.

4. The apparatus of claim 1 wherein the first LSPF node is configured with a Hadoop framework or a Spark framework.

5. A method comprising:
identifying, on a first large-scale processing framework (LSPF) node of a first LSPF cluster of a plurality of LSPF clusters; a first data access request generated by a process executing on the first LSPF node and, on a second LSPF node of a second LSPF cluster of the plurality of LSPF clusters; a second data access request generated by a process executing on the second LSPF node, wherein LSPF nodes of the first LSPF cluster comprise virtual computing nodes on one or more of host computing systems to perform parallel processing of a first data set according to a first version of a distributed file system and LSPF nodes of the second LSPF cluster comprise virtual computing nodes on one or more of the host computing systems to perform parallel processing of a second data set according to a second version of the distributed file system;
in response to identification of the first data access request and the second data access request, notifying a data service executing on one or more of the host computing systems regarding the first data access request and the second data access request;
receiving, by the data service, the first data access request from the first LSPF node of the first LSPF duster to access first requested data from a data repository, the first data access request comprising a request in accordance with the first version of the distributed file system,
receiving, by the data service, the second data access request from the second LSPF node of the second LSPF duster to access second requested data from the data repository, the second data access request comprising a request in accordance with the second version of the distributed file system, wherein the data service is shared by LSPF nodes of the plurality of LSPF clusters, and wherein data is stored in the data repository using a plurality of versions of the distributed file system, including a third version of the distributed file system that is different from the first version and the second version;
responsive to the first data access request and the second data access request, determining that the first requested data and the second requested data are stored using the third version of the distributed file system and access the data in the data repository for the first LSPF node and the second LSPF node in accordance with the third version of the distributed file system;
presenting, by the data service, the first requested data accessed from the data repository to the first LSPF node in accordance with the first version of the distributed file system used by the first LSPF node; and
presenting, by the data service, the second requested data accessed from the data repository to the second LSPF node in accordance with the second version of the distributed file system used by the second LSPF node.

6. The method of claim 5 wherein the distributed file system comprises a Hadoop distributed file system.

7. The method of claim 5 wherein the distributed file system comprises a Gluster file system.

8. The method of claim 5 wherein the first LSPF node is configured with a Hadoop framework or a Spark framework.

9. A non-transitory computer readable media storing instructions that, when executed by a processor, cause the processor to:
identify, on a first large-scale processing framework (LSPF) node of a first LSPF cluster of a plurality of LSPF clusters, a first data access request generated by a process executing on the first LSPF node and, on a second LSPF node of a second LSPF cluster of the plurality of LSPF clusters, a second data access request generated by a process executing on the second LSPF node, wherein LSPF nodes of the first LSPF cluster comprise virtual computing nodes on one or more of host computing systems to perform parallel processing of a first data set according to a first version of a distributed file system and LSPF nodes of the second LSPF cluster comprise virtual computing nodes on one or more of the host computing systems to perform parallel processing of a second data set according to a second version of the distributed file system;
in response to identification of the first data access request and the second data access request, notify a data service executing on one or more of the host computing systems regarding the first data access request and the second data access request;

receive, by the data service, the first data access request from the first LSPF node of the first LSPF duster to access first requested data from a data repository, the first data access request comprising a request in accordance with the first version of the distributed file system;

receive, by the data service, the second data access request from the second LSPF node of the second LSPF duster to access second requested data from the data repository, the second data access request comprising a request in accordance with the second version of the distributed file system, wherein the data service is shared by LSPF nodes of the plurality of LSPF clusters, and wherein data is stored in the data repository using a plurality of versions of the distributed file system, including a third version of the distributed file system, different from the first version and the second version;

responsive to the first data access request and the second data access request, determine that the first requested data and the second requested data are stored using the third version of the distributed file system and access the data in the data repository for the first LSPF node and for the second LSPF node in accordance with the third version of the distributed file system;

present the first requested data accessed from the data repository to the first LSPF node in accordance with the first version of the distributed file system used by the first LSPF node; and present the second requested data accessed from the data repository to the second LSPF node in accordance with the second version of the distributed file system used by the second LSPF node.

10. The method of claim 9 wherein the distributed file system comprises a Hadoop distributed file system.

11. The method of claim 9 wherein the distributed file system comprises a Gluster file system.

12. The method of claim 9 wherein the first LSPF node is configured with a Hadoop framework or a Spark framework.

\* \* \* \* \*